United States Patent
Ouzounov et al.

(10) Patent No.: US 10,823,864 B2
(45) Date of Patent: Nov. 3, 2020

(54) EARTHQUAKE WARNING SYSTEM

(71) Applicant: Ertha Space Technologies, Potomac Falls, VA (US)

(72) Inventors: Dimitar Ouzounov, Potomac Falls, VA (US); Sergey Pulinets, Troitsk (RU)

(73) Assignee: Ertha Space Technologies, Potomac Falls, VA (US)

( * ) Notice: Subject to any disclaimer, the term of this patent is extended or adjusted under 35 U.S.C. 154(b) by 0 days.

(21) Appl. No.: 16/827,668

(22) Filed: Mar. 23, 2020

(65) Prior Publication Data

US 2020/0225373 A1 Jul. 16, 2020

Related U.S. Application Data

(63) Continuation of application No. 16/214,087, filed on Dec. 9, 2018, now Pat. No. 10,598,804, which is a continuation of application No. 15/220,743, filed as application No. PCT/US2015/013624 on Jan. 29, 2015, now Pat. No. 10,185,045.

(Continued)

(51) Int. Cl.
*G01V 1/00* (2006.01)
*G01V 9/00* (2006.01)

(52) U.S. Cl.
CPC ............. *G01V 1/008* (2013.01); *G01V 9/005* (2013.01); *G01V 9/007* (2013.01)

(58) Field of Classification Search
CPC .................................................... G01V 1/008
See application file for complete search history.

(56) References Cited

U.S. PATENT DOCUMENTS

| 5,408,862 A | 4/1995 | Elkins |
| 5,625,138 A * | 4/1997 | Elkins ................... G01V 1/008 324/324 |
| 7,277,797 B1 | 10/2007 | Kunitsyn et al. |

OTHER PUBLICATIONS

Pulinets. Lithosphere-atmosphere-ionosphere coupling (laic) model. 2009. [retrieved on Mar. 24, 2015}. Retrieved from the Internet<URL:http://pulse1549.hut2.ru/PAPERS/Hayakawa%209_corrected .pdf >.

(Continued)

*Primary Examiner* — Manuel A Rivera Vargas
(74) *Attorney, Agent, or Firm* — Total Awareness Consulting Services; Robert Winslow

(57) ABSTRACT

Gas migration rate(s) are determined using gas measurements from gas migration measurement devices. In response to the gas migration rate increasing, at least one of: air ionization measurements are collected from air ionization measurement device(s), and meteorological measurements collected from air temperature sensor(s), relative humidity sensor(s), and air pressure sensor(s). A latent heat energy release rate is determined using at least two of: the air ionization measurements, the meteorological measurements, and a numerical assimilation model. In response to the latent heat energy release rate increasing, at least one transient outgoing long wave radiation (OLR) anomaly is looked for using atmospheric measurements. In response to observing the transient OLR, at least one ionospheric anomaly is looked for using ionosphere measurements. In response to observing the at least one ionospheric anomaly, a forecast alert that an earthquake is likely to occur within one to four days is generated.

20 Claims, 7 Drawing Sheets

Related U.S. Application Data

(60) Provisional application No. 61/934,798, filed on Feb. 2, 2014.

(56) References Cited

OTHER PUBLICATIONS

Ouzounov et al. Atmosphere-Ionosphere Response to the M9 Tohoku Earthquake Revealed by Joined Satellite and Ground Observations. 2012. [retrieved on Mar. 24, 2015]. Retrieved from the Internet<URL: http://agriculturedefensecoalition.org/sites/default/files/file/nuclear_japan/114V _ 1 2011_Atmosphere_Ionosphere_Response_to_M9_Japan_Earthquake_Abstract_March_ 11_2011.pdf >.

Qin et al. Preliminary analysis of surface temperature anomalies that preceded the two major Emilia 2012 earthquakes (Italy). 2012. [retrieved on Mar. 24, 2015]. Retrieved from the Internet: <URL: http://www.earth-prints.org/bitstream/2122/8615/1/Qin-K._Preliminary-analysis-of-surface-temperature-anomalies-that-preceded-the-two-major-Emilia.Annals.2012.pdf >.

Trique et al. Radon emanation and electric potential variationsassociated with transient deformation near reservoir lakes. 1999. [retrieved on Sep. 20, 2012}. Retrieved from the Internet: <URL:www.researchgate.net/profile/Patrick_Richon/publication/230560968_Radon emanation _and_ electric _potential_ variations_ associated_ with_ transient_ deformation near _reservoir _lakes/links/09e415121f36c571c9000000.pdf >.

Pulinets. Ionospheric Precursors of Earthquakes; Recent Advances in Theory and Practical Applications. 2004. [retrieved on Mar. 24, 2015]. Retrieved from the Internet<URL: www .researchgate.net/profile/Sergey _Pulinets/publication/252281011 _Ionospheric _precursors_of_ earthquakes._ Theory_ and practical_ applications/links/00b4952388029da66e000000. pdf>.

Ouzounov et al. Outgoing long wave radiation variability from IR satellite data prior to major earthquakes. 2006. [retrieved on Mar. 24, 2015]. Retrieved from the Internet: <URL:www .researchgate.net/profile/Guido _ Cervone/publication/223650285 _ Outgoing_ long_ wave radiation_variability_from_IR_satellite_data_prior_to_major_earthquakes/links/0c96051cc6ee9799d7000000.pdf>.

Liu et al. Pre-earthquake ionospheric anomalies registered by continuous GPS TEC measurements. 2004. [retrieved on Mar. 24, 2015]. Retrieved from the Internet<URL:https://hal.archives-ouvertes.fr/haf-00317335/document>.

\* cited by examiner

| | Earthquake Catalog (USGS) | | | | | Prospective earthquake forecast | | | | |
|---|---|---|---|---|---|---|---|---|---|---|
| # | Date | M | Region | Location | Date | Region | Location | M | Time Lag |
| 1. | 2013-01-05 | Mwp 7.7 | Southeastern Alaska | 55.3N/ 134.7W | 2012-12-05 | Northern Canada- Queen Charlotte | 53N/ 132W | M6+ | 29 days |
| 2. | 2012-12-10 | Mwb 7.1 | Banda sea | 6.5S/ 129.8E | 2012-12-04 | Indonesia- Banda Sea | 5S/ 127E | M6.5+ | 6 days |
| 3. | 2012-12-07 | Mwp 7.3 | off east coast of Honshu, japan | 37.9N/ 144.1E | 2012-11-23 | Japan- off coast of Honshu | 35N/ 145E | M6.5+ | 14 days |
| 4. | 2012-11-07 | Mww 7.4 | Guatemala | 14.1S/ 91.9W | 2012-10-14 | Guatemala | 16S/ 90W | M6+ | 22 days |
| 5. | 2012-10-28 | Mwp 7.7 | Queen charlotte islands | 52.8/ 131.9W | 2012-10-01 | Canada- Vancouver Island | 48N/ 131W | M5.5+ | 26 days |

FIG. 3

EARTHQUAKE WARNING SYSTEM

CROSS-REFERENCE TO RELATED APPLICATIONS

This application is a continuation of U.S. patent application Ser. No. 16/214,087, filed Dec. 9, 2018, which is a continuation of U.S. patent application Ser. No. 15/220,743, filed Jul. 27, 2016, which is a continuation of PCT International Patent Application No. PCT/US2015/013624, filed Jan. 29, 2015, which claims the benefit of U.S. Provisional Application No. 61/934,798, filed Feb. 2, 2014, which are all hereby incorporated by reference in their entirety.

BACKGROUND

An earthquake (also known as a quake, tremor or temblor) may be the result of a sudden release of energy in the Earth's crust that creates seismic waves that may cause massive damage and loss of life. What is needed is a reliable mechanism to forecast future earthquake events days in advance of occurring.

BRIEF DESCRIPTION OF THE SEVERAL VIEWS OF THE DRAWINGS

The accompanying drawings, which are incorporated in and form a part of the specification, illustrate an embodiment of the present invention and, together with the description, serve to explain the principles of the invention.

FIG. 3 is a chart showing a tubular set of earthquake data correlated with prospective forecasts according to an aspect of the embodiment of the present invention.

DETAILED DESCRIPTION OF THE INVENTION

Embodiments of the present invention relate to multi parameter monitoring of atmospheric and ionospheric physical precursors from remote sensing (e.g. earth observation satellites) and ground observations for automatic detection of pre-earthquake anomalies used for short-term forecasting of strong earthquakes. Embodiments may warn of potential earthquakes days in advance of occurring. Presently claimed embodiments may be configured to detect the process of atmosphere awakening prior to major earthquakes, as a direct result of Lithosphere Atmosphere Ionosphere Coupling process (LAIC) that occur prior to the occurrence of a major earthquake employing measurements observed by the analysis of remote (e.g. satellite) and in-situ atmospheric and space plasma data. A suite of multi-parameter observations may be employed as a synergy web of multi-instrument space-borne and ground observations to identify pre-earthquake atmospheric signals that originate from strong earthquakes. Patterns related to anomalies in the atmosphere and ionosphere may be detected through measurements characterizing the state of the atmosphere including gas discharge, thermal infrared radiation, ionospheric electron and ion density and temperature, atmospheric temperature and relative humidity, and the like. An adaptive framework utilizes targeted observations in order to achieve a short-term (e.g. 1-30 days) and mid-term (e.g. 1-2 months) alerts for the possible location of large earthquakes (e.g. earthquakes with magnitudes greater than 5.5 on the Richter scale).

Embodiments of the present invention employ modern technologies to advance developing earthquake warning systems to generate alerts from hours to days in advance of an actual earthquake.

Figure 1:
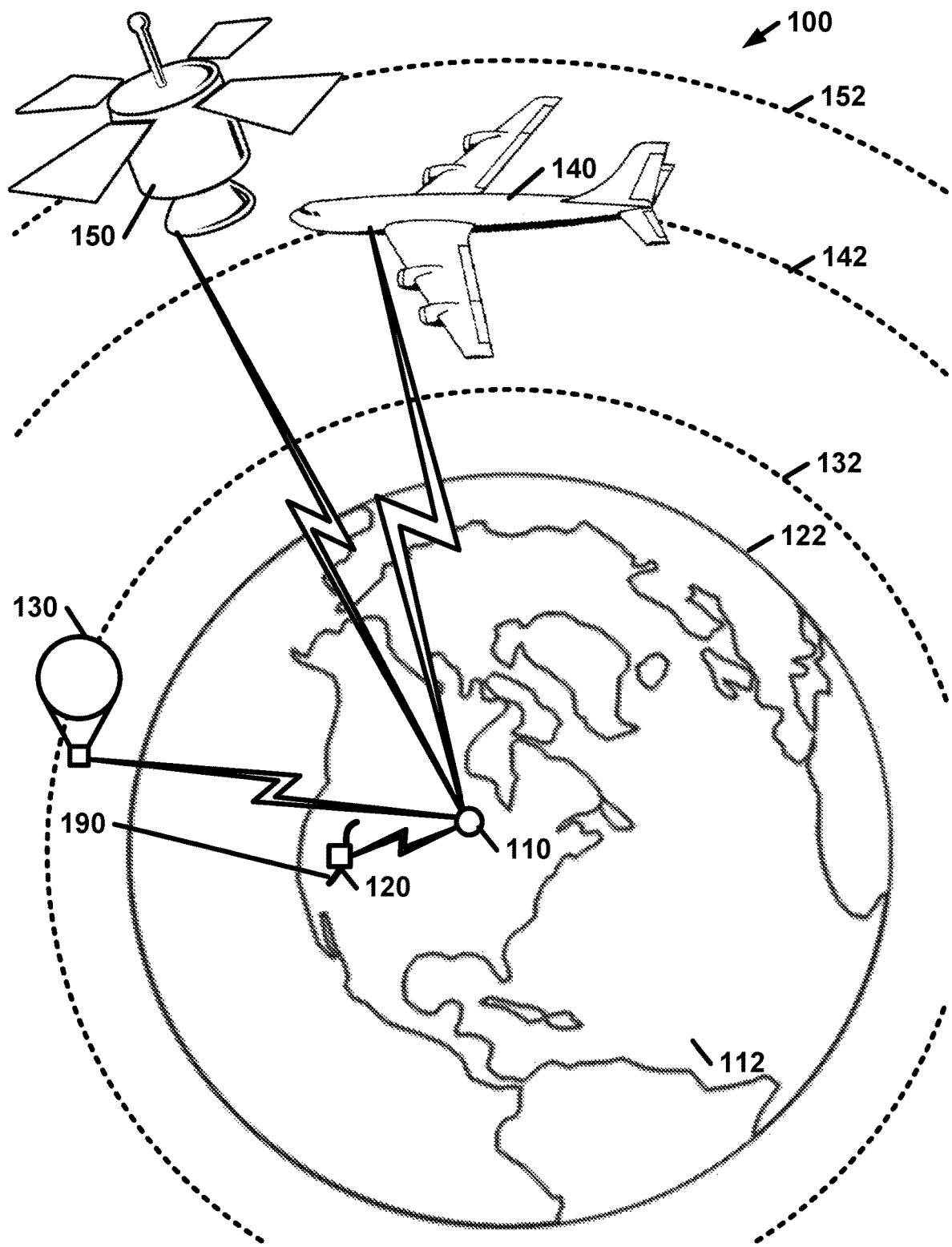
FIG. 1 is an example visual depiction of network of equipment and sensing devices employed in the multi-parameter atmospheric observations according to aspects of an embodiment of the present invention.

FIG. 1 shows an example network of atmospheric and ionospheric sensing equipment as well as ground stations that together comprise a network of monitoring systems used according to aspects of embodiments of the present invention 100. The earth 122 is ringed by atmospheric 132, ionospheric 142, and magnetospheric 152 regions surrounding the planet. Example remote sensing platforms are shown including satellites 150, aircraft 140, and floating-in-air craft 130. These platforms may operate and differing altitudes in order to make corresponding measurements of the effects generated by LAIC processes according to aspects of embodiments of the present invention. These example platforms may monitor a geographic region 120 of seismic activity and communicate with a ground station 110 that includes processing equipment to collect and analyze measurement data used to forecast the likelihood of an earthquake.

Figure 2:
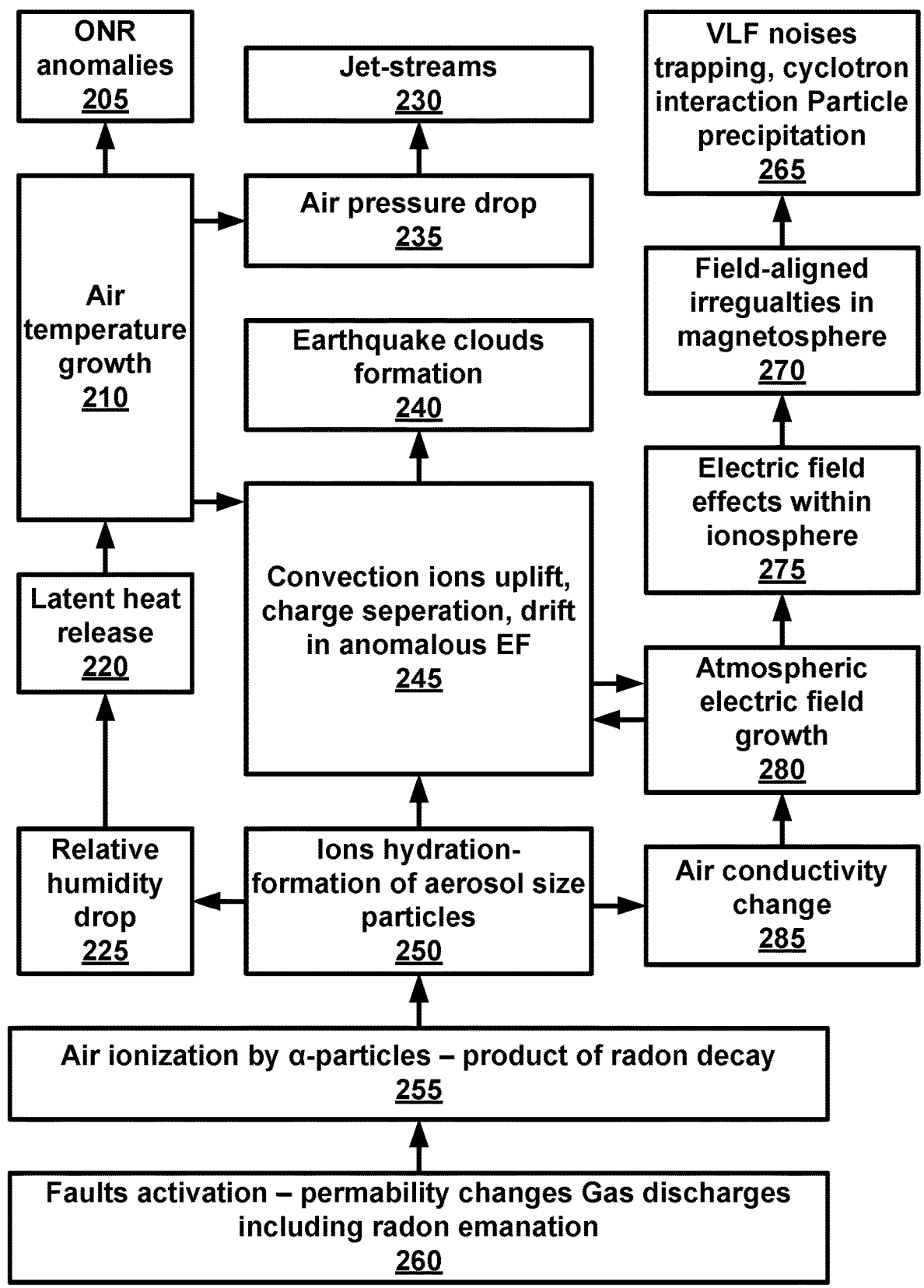
FIG. 2 is a schematic of an example Lithosphere-Atmosphere-Ionosphere Coupling (LAIC) model according to an aspect of an embodiment of the present invention.

FIG. 2 is an example Lithosphere-Atmosphere-Ionosphere Coupling (LAIC) model according to an aspect of an embodiment of the present invention. A Lithosphere-Atmosphere-Ionosphere Coupling (LAIC) model is a multi-parameter, multi-media concept that explains a chain of observed pre-phenomena in their complexity and presents a synergy of different dynamic time-dependent processes connected to forecast an earthquake. Gas migration variations within an earthquake preparation zone may be correlated to emerging anomalies in the atmosphere and ionosphere. Some of the connections between gas rate change and emerging anomalies associated with earthquakes may be explained by the LAIC model and discussed in detail below.

LAIC processes determine the prognostic multi-parameter and multi-media concepts employed by aspects of embodiments of the present invention in forecasting the likelihood of a large earthquake event. Several phenomena serve as precursors to large earthquakes and may have a common air ionization 255 source. Air ionization 255 may be produced by Radon gas emanating from active tectonic faults 260. This then follows with air ionization, ion's hydration and aerosol formation 250 that migrate into the atmosphere. Chemical reactions may occur that generate new-formed ions that start a series of events that may be monitored and/or analyzed to forecast the likelihood of an earthquake. Ionization also occurs in clouds by the effects of galactic cosmic rays, so these effects are known. The process of ion-induced nucleation (IIN) may be observed in the boundary layer of the atmosphere. This process has two consequences leading to the generation of two main groups of precursors, namely atmospheric precursors and ionospheric precursors. Ions may be lifted by convection 245 and by drift in the vertical electric field 280 producing earthquake cloud formation from when produced the thermals approach condensation points. Those effects may be accompanied by relative humidity 225 drops and air conductivity changes 285 producing a chain reaction of ancillary effects characterized by latent heat release 220, air temperature growth 210, and OLR (Outgoing Long-wave Radiation) anomalies 205. Air conductivity changes 285 may produce atmospheric electric field growth 280 imparting ionospheric electric field event(s) 275. These fields may propagate to the magnetosphere causing a realignment of electric fields 270 and subsequent Very Low Frequency (VLF) noises trapping, and particle precipitation 265 due to particle diffusion in the loss cone.

Atmospheric precursors may be considered taking into account the thermodynamic and hydrodynamic processes of transformation of latent heat release 220 of water vapor molecules into thermal energy released into the atmosphere and registered by ground based measurements of, for example, air temperature growth 210 by satellite infrared sensors 150. A reverse cascade turbulence may lead to negative turbulent diffusivity and viscosity and merging of small-scale helical structures close to the ground level formed by thermal turbulence close to active tectonic faults into a large-scale thermal spot at the top of the cloud level. This may be registered by, for example, satellites as anomalous earth radiation flux-Outgoing Long-wave Radiation (OLR).

Ionospheric precursors may be generated through processes associated within a global electric circuit. Bursts of Ion Induced Nucleation (IIN) stimulated by air ionization processes may lead to abrupt changes of air conductivity 285 and consequent change of ionosphere potential relative to the ground 275. Local variations of ionosphere potential may lead to formation of irregularities of electron and ion concentration in the ionosphere 270, stimulation of plasma instabilities leading to variations of plasma temperature and ion composition as well as generation of EM emissions. Joule heating at altitudes of maximum ionosphere conductivity may lead to the generation of acoustic gravity waves. Due to high conductivity along geomagnetic field lines, plasma turbulence from ionospheric altitudes may be projected into the magnetosphere and magnetically conjugated region.

Embodiments of the present invention may include multi-parameter observation. Rationale for using multi-parameter observations are two: (1) The complex nature of the lithosphere/atmosphere coupling processes and the synergy coupling between them; and (2) there may be insufficient spatial and temporal coverage of any one of precursory signals. For example, no single existing method (thermal infrared (TIR), Surface Latent Heat Flux (SLHF), or GPS/TEC) may provide a successful solution for alerting in advance the earthquake events on a global scale. However, simultaneous use of different types of measurements as an integrated web may provide necessary information by combining the information provided by multiple sensing sources, for example, from ground based sensors and space based sensors. Embodiments may enable multiple physical measurements to be fused into the LAIC model framework of pre-earthquake generation and propagation, and provide feedback on data gaps which may then be acquired from other sources.

Some of the various embodiments may employ a methodology of detection and/or analysis of the chain of physical processes formed in the atmosphere and ionosphere in the time occurring before a major earthquake. This cascade type of processes may lead to measurable events in the atmosphere that function as an awakening of pre-earthquake anomalies in such order. These events may be broken down into discrete but inter-related phases as set forth below.

Phase 1 may be correlated with gas migration 520 (Radon) in the crust and exhalation into the atmosphere. This effect may be characterized by natural ground radioactivity from the decay of radon and other gases in the vicinity of active tectonic faults and may be a source of atmospheric and ionospheric anomalies that may be observed, for example, weeks up to a few days before strong earthquakes within (or over) an earthquake preparation area. These types of pre-earthquake anomalies may include an increasing radon concentration rate in the days (week(s)) before a main shock.

Phase 2 may be correlated with air ionization by Radon and other gasses as well as ion clusters formation. Air ionization produced by alpha-particles resulting from $^{222}$Rn isotope decay may start a chain of processes involving all layers of the atmosphere and ionosphere and may lead to a large amount of thermal energy exhalation due to latent heat release 540 by water molecules during their attachment to the ions produced by ionization. These types of pre-earthquake anomalies may include a latent heat energy release rate in the atmosphere that abnormally increases in the middle atmosphere over an earthquake preparation region.

Phase 3 may be correlated with atmospheric thermodynamic change 560. Latent heat released due to water vapor condensation of ions may lead to formation of fluxes forming anomalous spots of Outgoing Long wave Radiation (OLR) at the top of the atmosphere. OLR may be detected by sensing equipment such as remote sensing satellites and/or the like. Changes in atmospheric parameters such as surface air temperature, relative humidity, and air pressure may be observed in the temporal chain with some delay from the lower levels to the upper levels. For example, ground surface temperature elevation and ground air temperature elevation. These types of pre-earthquake anomalies may include transient OLR anomalies that appear as rapid increases in radiation (e.g. hot spots) on the top of atmosphere over earthquake preparation zones days up to a month before a major event. OLR anomalies may be detectable, for example, from various observation platforms such as satellites. These perceptible effects may be detected as rapid increases in daily/hourly variations of air temperate together with a sudden drop of relative humidity close the epicentral area. Detection of these perceptible effects may be accomplished by, for example, weather monitoring stations.

Phase 4 may be associated with variations of air conductivity. Changes in atmospheric electricity may be caused through conductivity changes due to ion clusters formation and interaction with aerosols producing local modifications of the parameters of a global electric circuit. A vertical electric field over an active tectonic fault may confine ions fluxes to be planar. This, in part, may form the linear shape of earthquake clouds along main fault lines. These types of pre-earthquake anomalies may include convective air motion due to latent heat release that raises additional number of ion clusters/condensation nuclei to an altitude of, for example, several kilometers leading to the formation (or dispersion) of clouds. Lifting of ions may also be possible with the increase of the vertical atmospheric electric field.

Phase 5 may include ionospheric anomalies 580 and effects. Variations in atmosphere electricity may induce variations in the ionosphere including anomalous variations of plasma concentration and temperature, ion composition changes, optical emissions, ELF-VLF noises, coupling with magnetosphere and particle precipitation. These effects may be associated with effects from previous phases and taken together may serve to form a detection and/or analysis methodology employable by various embodiments of the present invention.

The events discussed in phases 1-5 noted above may be taken together as measurable precursors that form a signature indicative of pre-earthquake anomalies: Variations in the ionosphere may include electron and ion concentration, electron and ion temperature, ion composition, and height scale. Ionospheric anomalies may modify the magnetospheric tube loaned onto the modified area leading to the VLF noises scattering into the modified tube and stimulated precipitation of energetic electrons. Precipitating electrons may modify the D-region of the ionosphere (lowering) leading to the anomalous propagation of VLF waves within the waveguide Earth-ionosphere.

Most of the observed effects in phases 4 and 5 may be bipolar in nature. That is, they may occur as positive or negative, increasing or decreasing, and/or dependent upon electric charge signs and phases of the ionization process such as and increase or decrease of air conductivity depending of the ion's cluster size, as well as polarization of the formed large scale space charges over the ground surface.

Figure 4:
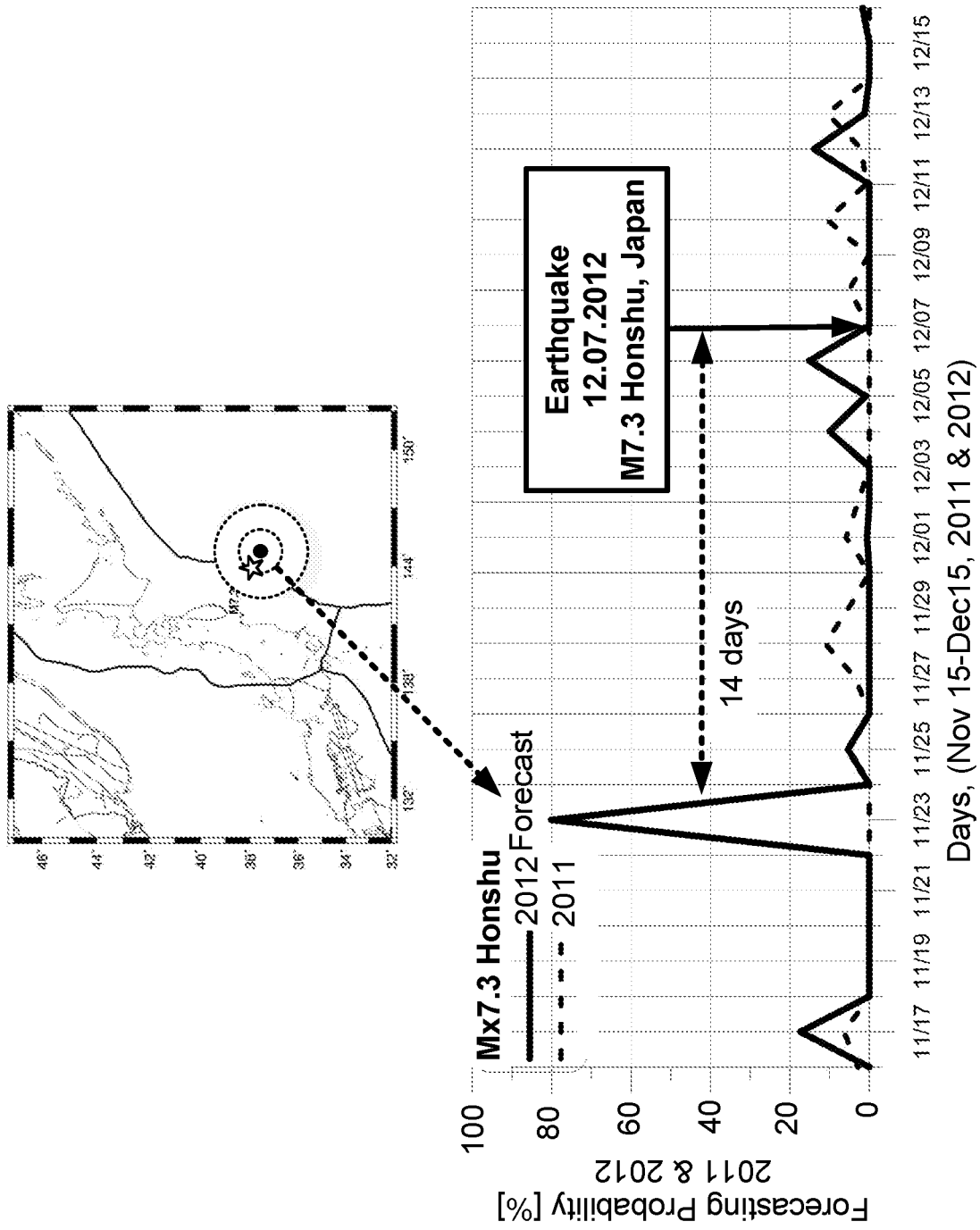
FIG. 4 is a graph showing spatial and temporal matrix results for a previous earthquake forecast as alerted by aspects of an embodiment of the present invention.

An example embodiment is illustrated that analyzes historical data by measuring various physical precursors and anomalous effects discussed above prior to the occurrence of actual strong earthquakes. One set of examples is set forth in tabular form in FIG. 3 and shows prospective forecast results by analyzing precursor measurement data for 4 actual earthquakes from the USSG catalog that occurred from October 2012 to January 2013. The data shows a statistically significant correlation of precursor events in each of the large magnitude earthquakes that occurred. Additionally, FIG. 4 shows a spatial and temporal matrix depicting the forecast of the 7 Dec. 2012 M7.3 earthquake that occurred of Honshu, Japan, 14 days before it occurred. The time lag for these forecasting alerts varies between 6 and 29 days. These types of strong earthquakes are very high risk events that carry the potential for catastrophic damage, human casualties, as well as long-term social impacts.

Embodiment of the present invention that are configured to forecast the likelihood of an earthquake may be performed as a method. The method may include a series of actions including collecting multiple measurements over a predetermined geographic area and making determinations using data and parameters associated with these measurements. The method may also be implemented by a computer program, or by collecting the measurement data and performing the determinations manually.

Figure 5:
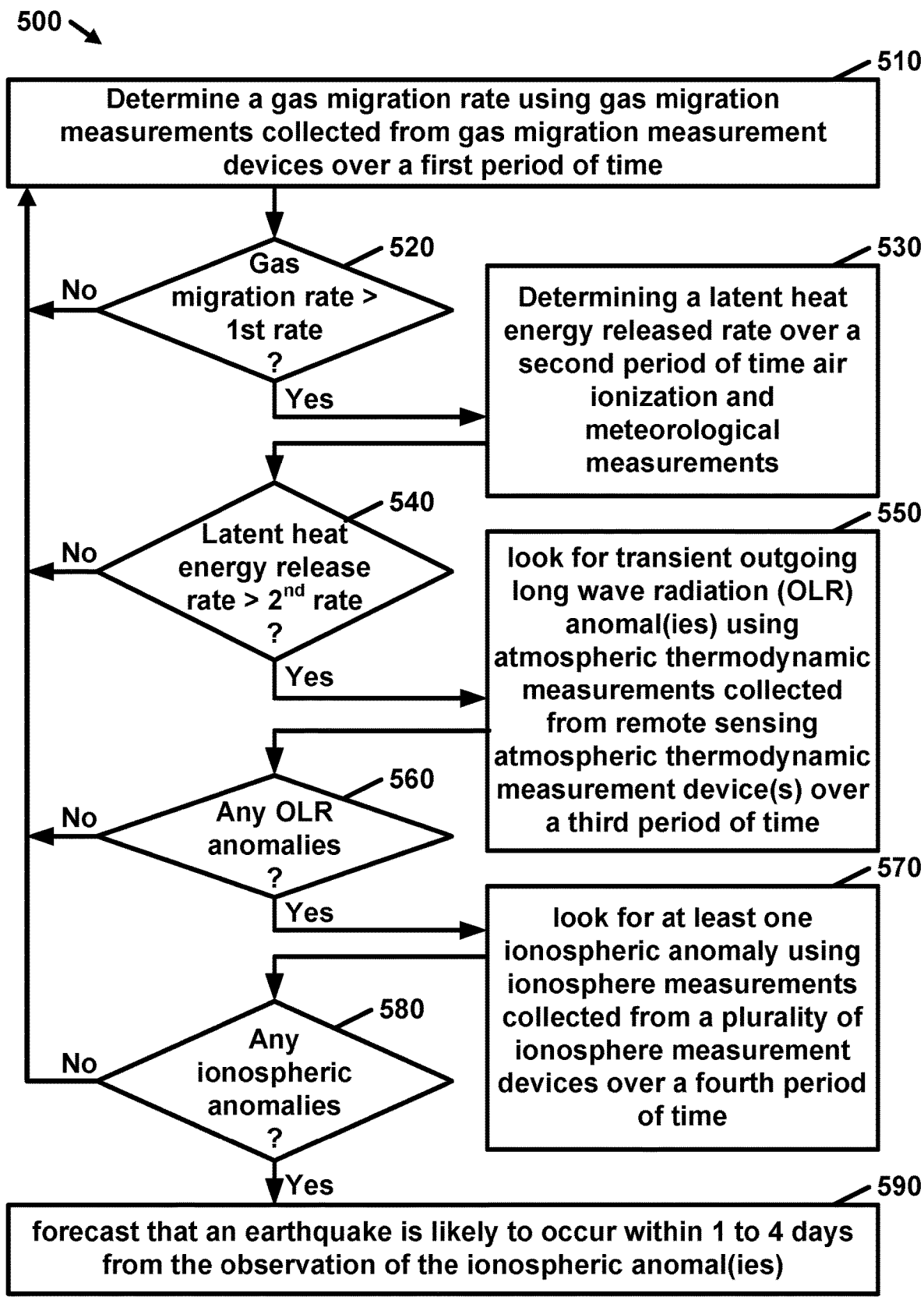
FIG. 5 is a flow diagram of example large earthquake forecasting employing multi-parameter observations according to aspects of an embodiment of the present invention.

FIG. 5 shows a flow chart of actions associated with the method of forecasting the likelihood of an earthquake 500 as per an aspect of an embodiment of the present invention. According to some aspects of an embodiment, a gas migration rate may be determined (510) using measurements collected from a multitude of measurement devices. Then, if the gas migration rate increases at greater than a first rate (520), a latent heat energy release rate may be determined at 530. The gas migration rate measurements may measure different types of gases, such as, for example, Radon, Methane, Carbon Dioxide, and Helium, and/or the like. According to some of the various embodiments, the gas migration rate measurements may include measuring radon activity using at least one of a multitude of measurement devices. Rates of gas migration may vary depending upon factors according to aspects of embodiments of the present invention. Variability of times associated with the gas migration rate may be factors in making accurate forecasts. The period of time for making the first set of measurements may be, for example, between one to fifteen days. After these measurements peak, the latent heat energy release rate may be measured during a second period of time. The second period of time may start after a peak in the radon activity. According to some of the various embodiment, the second period of time may start after a peak in the radon activity that exceeds, for example, 2000 Becquerel per cubic meter at, for example, a level from approximately −70 cm up to approximately ground level. The second period of time may be, for example, between four days to one week.

Gas migration measurement devices are available commercially from several vendors and may be tailored for use in the atmosphere or other environments. Additionally, customized sensors may be fabricated and mounted on sensing platforms with, for example communications equipment to transfer measurements to a data processing facility. According to some of the various embodiments, a series of gas migration measurement devices may be used at different altitudes in the atmosphere. These measurement devices may be hosted on aircraft or the like. Some examples of Radon gas migration measurement devices are from Gas Measurement Instruments Ltd. of Renfrew, Scotland and United Nuclear Supplies and Equipment of East Lansing, Mich.

The latent heat energy release rate may be measured using one of the following techniques, for example: (1) air ionization measurements collected from at least one remote sensing air ionization measurement device, (2) meteorological measurements from at least one air temperature sensor and at least one relative humidity sensor, (3) a numerical assimilation model, and/or like methods of measuring latent heat energy. Radon activity may be associated with formation of particles of between, for example, 500 and 1150 nm in size and may generate a thermal energy output of, for example, approximately 16 watts per meter squared.

Numerical assimilation models may be employed to process measurement data associated with aspects of embodiments of the present invention. Example numerical assimilation models include the Goddard Earth ObServation (GEOS) and the Modern Era Restrospective Analysis (MERRA) models. Both of these example models were implemented under the direction of the NASA Global Model and Assimilation Office. Measurement data may be sourced from various types of data such as, for example, satellite, ground, or theoretical estimates may be used in the numerical assimilation modes.

According to further aspects of an embodiment, if the latent heat energy release rate increases at greater than a second rate 540, at least one transient OLR anomaly 550 may be looked for using measurements collected from at least one remote sensing atmospheric thermodynamic measurement. For example, one manner of making this measurement may be using atmospheric thermodynamic measurements collected from at least one remote sensing measurement device over a third period of time ranging from, for example, one to two days.

According to some of the various embodiments, if OLR anomaly has been observed (560), determining, at least one ionospheric anomaly using ionosphere measurements collected from a plurality of ionosphere measurement devices (570) over a fourth period of time of between, for example, between one to four days. Additionally, after an OLR anomaly has been observed (580), convective air motion values may be determined using air conductivity measurements collected from at least one air conductivity measurement device over a period of, for example 1 to 5 days. Air conductivity measurement devices are available commercially from several vendors. One such device is the CON 110 handheld conductivity/TDS meter by Oakton Instruments of Vernon, Ill. Ionospheric anomalies may occur in nature over variable time periods. However, a temporal length of between, for example, one to ten hours may correlate with pre-earthquake events. The trend may be determined against a normal that defined by, for example, a multiyear average of ongoing long wave radiation.

Ionosphere measurements may come from a variety of sources and devices, for example: (1) a GPS/GLONASS receiver, (2) vertical ionosondes, (3) oblique ionospheric sounders, (4) ionospheric in-situ measurement satellites; (5) topside-sounder satellites, and/or the like remote ionospheric measurement equipment. These anomalies may be one of the following types, for example: (1) an ionospheric electron and ion concentration anomaly, (2) an ionospheric electron and ion temperature anomaly, (3) an ionospheric ion composition anomaly; (4) an ionospheric height scale anomaly, and/or the like. At least one additional ionospheric anomaly may be triggered by one of the ionospheric anomalies set forth above, and may include the following, for example: (1) an ionospheric very low frequency (VLF) noise scattering anomaly, an ionospheric electrostatic ELF wave anomaly (e.g. <500 Hz), (2) an ionospheric precipitation of energetic electrons anomaly, (3) an anomalous modification of D-Regions; (4) an anomalous propagation of VLF waves within wave-guide Earth-ionosphere, and/or the like.

Additional measurements may be determined according to aspects of embodiments of the present invention including determining a local deformation rate change using local deformation measurements. The gas migration rate may be adjusted by the local deformation rate change. Additional measurements may be derived from collecting aerosol measurements from a network of aerosol measurement devices. The measurements may be used to determine changes in local aerosol type and size as additional factors used in determining the latent heat energy released rate.

Then, according to aspects of the embodiments of the present invention as set forth above, if at least one ionospheric anomaly has been observed, an earthquake event may be forecasted to occur, for example, from within one to four days (590) of their occurrence.

Figure 6:
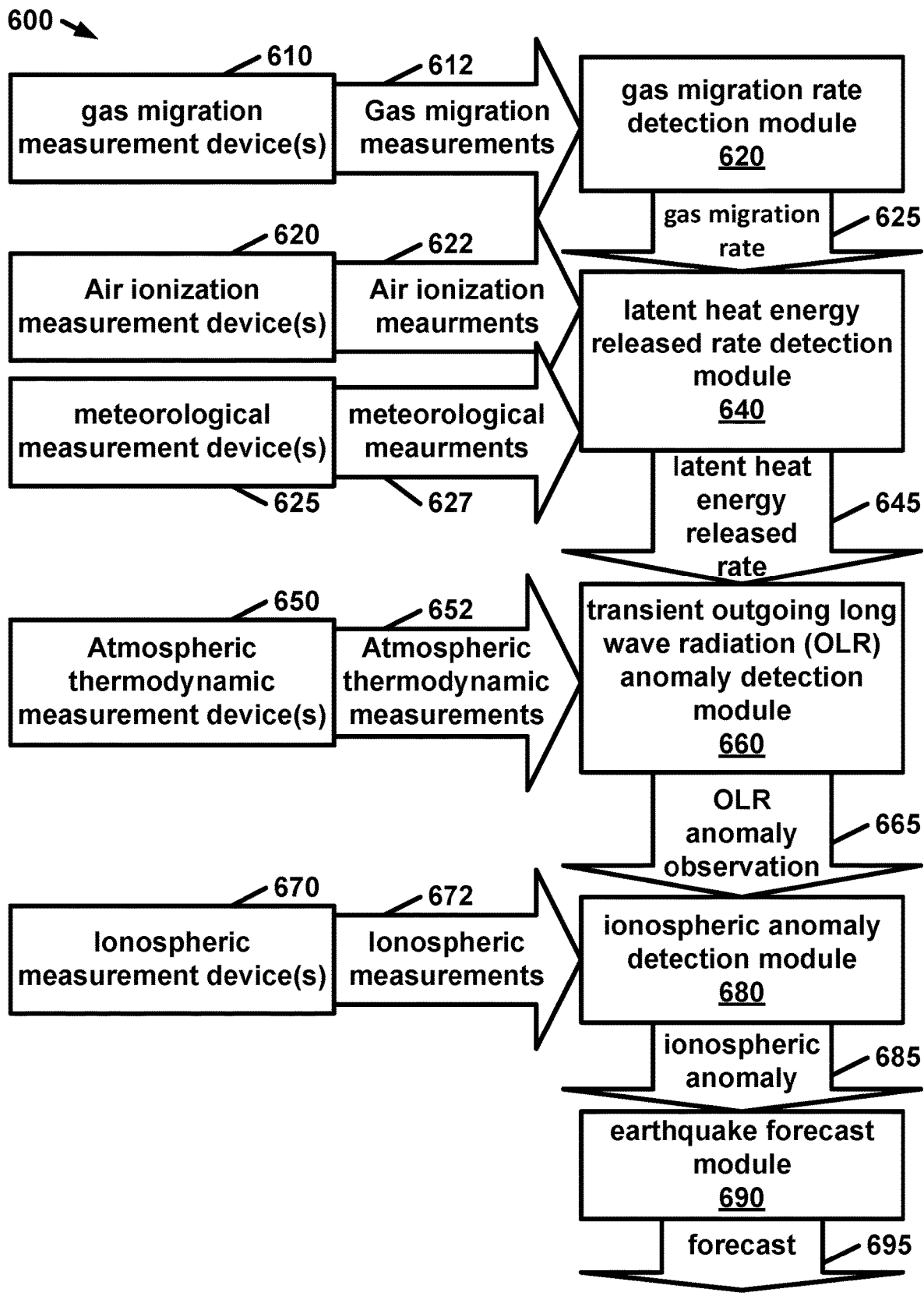
FIG. 6 is a block diagram of an example earthquake forecasting system as per an aspect of an embodiment of the present invention.

FIG. 6 shows an example block diagram of a system 600 configured to forecast the likelihood of an earthquake as per an aspect of an embodiment of the present invention. The system 600 may include, for example, a gas migration rate detection module 620, a latent heat energy release rate detection module 640, a transient Outgoing Long wave Radiation (OLR) anomaly detection module 660, an ionospheric anomaly detection module 680, and earthquake forecast module 690.

The gas migration rate detection module 620 may be used and configured to determine a gas migration rate 612 using measurements collected from a multitude of measurement devices over a first period of time.

The latent heat energy release rate detection module 640 may be used and configured to determine if the gas migration rate increases at greater than a first rate than a latent heat energy release rate over a second period of time may be determined using, for example, at least two of the following measurements techniques, for example: (1) air ionization measurements 622 collected from at least one remote sensing air ionization measurement device 620, (2) meteorological measurements 627 from meteorological measurement devices 625 such as at least one air temperature sensor and at least one relative humidity sensor, (3) a numerical assimilation model, and/or like latent heat energy rate measurement techniques.

The transient OLR anomaly detection module 660 may be configured to collect atmospheric thermodynamic measurements 652 from, for example, remote sensing atmospheric thermodynamic measurement devices 650 over a third period of time if the latent heat energy released rate increases at greater than a second rate.

The ionospheric anomaly detection module 680 may be configured to observe transient OLR anomalies. If an OLR is observed, then ionosphere measurements 672 collected from a plurality of ionosphere measurement devices 670 over a fourth period of time may be observed for the existence of an at least one ionospheric anomaly 685.

The earthquake forecast module 690 may be configured to forecast that an earthquake 695 is likely to occur within, for example, one to four days from the detection of at least one ionospheric anomaly by the ionospheric anomaly detection module 680.

Additional capabilities such as new observing parameters and sensing technology may be incorporated as they become available.

Figure 7:
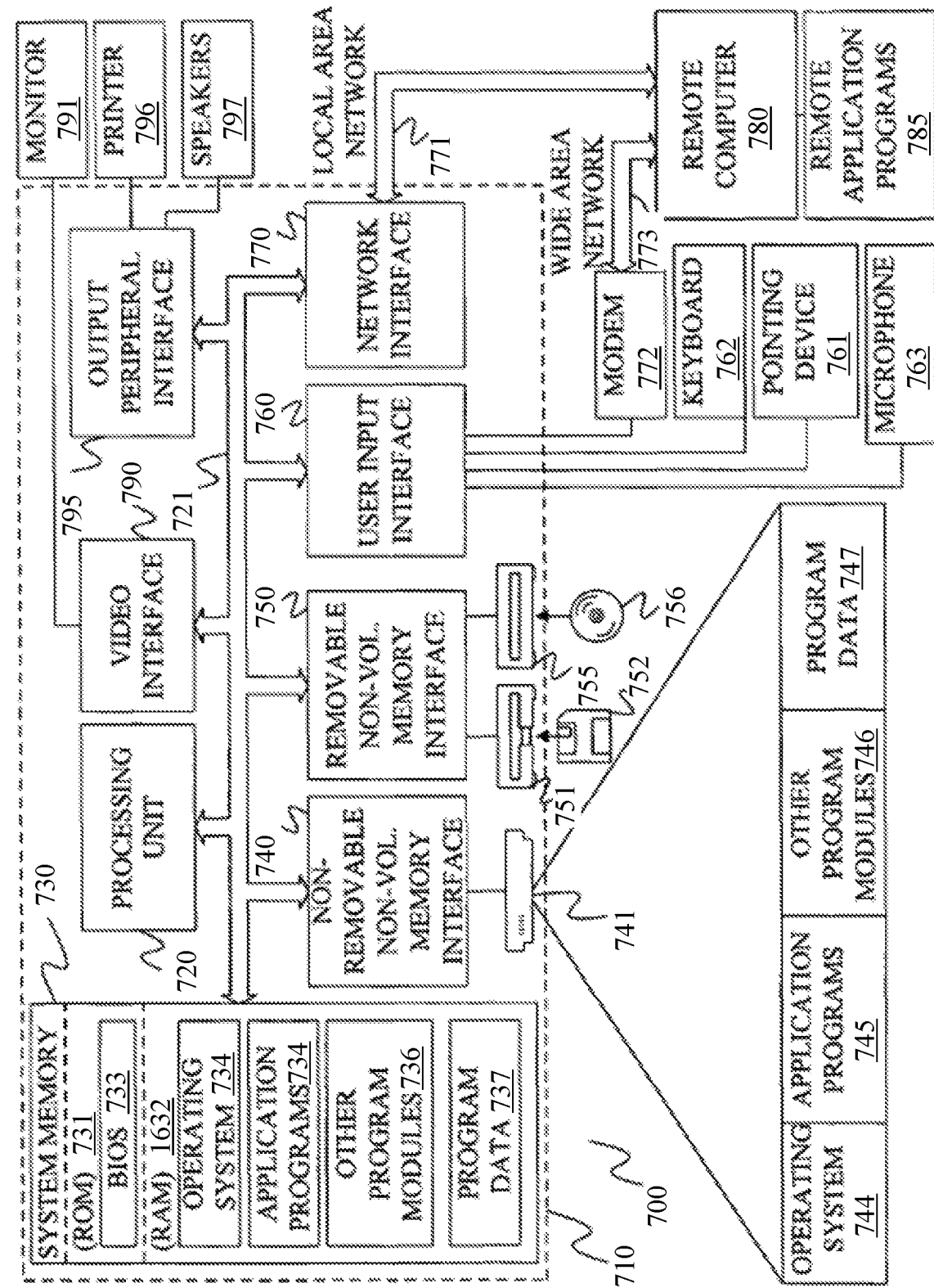
FIG. 7 is a block diagram of an example computer processing system according to an aspect of the embodiment of the present invention.

FIG. 7 illustrates an example of a suitable computing system environment 700 on which embodiments may be implemented. The computing system environment 700 is only one example of a suitable computing environment and is not intended to suggest any limitation as to the scope of use or functionality of the claimed subject matter. Neither should the computing environment 700 be interpreted as having any dependency or requirement relating to any one or combination of components illustrated in the exemplary operating environment 700.

Embodiments are operational with numerous other general purpose or special purpose computing system environments or configurations. Examples of well-known computing systems, environments, and/or configurations that may be suitable for use with various embodiments include, but are not limited to, personal computers, server computers, hand-held or laptop devices, multiprocessor systems, microprocessor-based systems, set top boxes, programmable consumer electronics, network PCs, minicomputers, mainframe computers, telephony systems, distributed computing environments that include any of the above systems or devices, and the like.

Embodiments may be described in the general context of computer-executable instructions, such as program modules, being executed by a computer. Generally, program modules include routines, programs, objects, components, data structures, etc. that performs particular tasks or implement particular abstract data types. Some embodiments are designed to be practiced in distributed computing environments where tasks are performed by remote processing devices that are linked through a communications network. In a distributed computing environment, program modules are located in both local and remote computer storage media including memory storage devices.

With reference to FIG. 7, an example system for implementing some embodiments includes a general-purpose computing device in the form of a computer 710. Components of computer 710 may include, but are not limited to, a processing unit 720, a system memory 730, and a system bus 721 that couples various system components including the system memory to the processing unit 720.

Computer 710 typically includes a variety of computer readable media. Computer readable media can be any available media that can be accessed by computer 710 and includes both volatile and nonvolatile media, removable and non-removable media. By way of example, and not limitation, computer readable media may comprise computer storage media and communication media. Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 610. Communication media typically embodies computer readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 730 includes computer storage media in the form of volatile and/or nonvolatile memory such as read only memory (ROM) 731 and random access memory (RAM) 732. A basic input/output system 733 (BIOS), containing the basic routines that help to transfer information between elements within computer 710, such as during start-up, is typically stored in ROM 731. RAM 732 typically contains data and/or program modules that are immediately accessible to and/or presently being operated on by processing unit 720. By way of example, and not limitation, FIG. 7 illustrates operating system 734, application programs 735, other program modules 736, and program data 737.

The computer 710 may also include other removable/non-removable volatile/nonvolatile computer storage media. By way of example only, FIG. 7 illustrates a hard disk drive 741 that reads from or writes to non-removable, nonvolatile magnetic media, a magnetic disk drive 751 that reads from or writes to a removable, nonvolatile magnetic disk 752, and an optical disk drive 755 that reads from or writes to a removable, nonvolatile optical disk 756 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 741 is typically connected to the system bus 721 through a non-removable memory interface such as interface 740, and magnetic disk drive 751 and optical disk drive 755 are typically connected to the system bus 721 by a removable memory interface, such as interface 750.

The drives and their associated computer storage media discussed above and illustrated in FIG. 7, provide storage of computer readable instructions, data structures, program modules and other data for the computer 710. In FIG. 7, for example, hard disk drive 741 is illustrated as storing operating system 744.

A user may enter commands and information into the computer 710 through input devices such as a keyboard 762, a microphone 763, and a pointing device 761, such as a mouse, trackball or touch pad. These and other input devices are often connected to the processing unit 720 through a user input interface 760 that is coupled to the system bus, but may be connected by other interface and bus structures, such as a parallel port, game port or a universal serial bus (USB). A monitor 791 or other type of display device is also connected to the system bus 721 via an interface, such as a video interface 790.

The computer 710 is operated in a networked environment using logical connections to one or more remote computers, such as a remote computer 780. The remote computer 780 may be a personal computer, a hand-held device, a server, a router, a network PC, a peer device or other common network node, and typically includes many or all of the elements described above relative to the computer 710. The remote computer may be providing remote sensing data over a suitable network to servers located at ground station 110. The logical connections depicted in FIG. 7 include a local area network (LAN) 771 and a wide area network (WAN) 773, but may also include other networks. Such networking environments are commonplace in offices, enterprise-wide computer networks, intranets and the Internet.

When used in a LAN networking environment, the computer 710 is connected to the LAN 771 through a network interface or adapter 770. When used in a WAN networking environment, the computer 710 typically includes a modem 772 or other means for establishing communications over the WAN 773, such as the Internet. The modem 772, which may be internal or external, may be connected to the system bus 721 via the user input interface 760, or other appropriate mechanism. In a networked environment, program modules depicted relative to the computer 710, or portions thereof, may be stored in the remote memory storage device. By way of example, and not limitation, FIG. 7 illustrates remote application programs 785 as residing on remote computer 780. It will be appreciated that the network connections shown are exemplary and other means of establishing a communications link between the computers may be used.

According to some of the various embodiments, the modules for performing the methods set may be embodied as a series of instructions executable by one or more processors stored on various computer-readable mediums. The term "computer-readable medium" as used herein refers to any medium that participates in the processes described above. The computer readable medium may be a computer readable signal medium or a computer readable storage medium.

A computer readable storage medium may be, for example, but not limited to, an electronic, optical, magnetic, electromagnetic, or semiconductor system, apparatus, or device, or any suitable combination of the foregoing. More specific examples (a non-exhaustive list) of the computer readable storage medium may include the following: a portable computer diskette such as a floppy disk or a flexible disk, magnetic medium, a hard disk, ROM, EPROM (flash), RAM or any other memory chip or cartridge, a portable compact disc read-only memory (CD-ROM), an optical storage medium, a tape, punch cards, paper tape, an integrated circuit, any other physical medium with patterns of holes, or any other medium usable by a computer now known or hereinafter developed. A computer readable storage medium may be a tangible, non-transitory medium that can contain, or store a program for use by or in connection with an instruction execution system, apparatus, or device or data that is used in the program or the instructions execution system.

A computer readable signal medium may include a propagated data signal with computer readable program code embodied therein, for example, in a base band or as part of a carrier wave. Program code embodied on a computer readable signal medium may be transmitted using any appropriate medium, including but not limited to wireless, wire line, optical fiber cable, RF, and/or any suitable combination of the foregoing.

Although the enabling instructions might be "written on" a diskette, "stored in" an integrated circuit, or "carried over" a communications circuit, it will be appreciated that, for the purposes of this application, the computer readable medium will be referred to as "including" the instructions. Thus, the term "including" is intended to encompass the above and all equivalent ways in which instructions may be associated with a computer usable medium.

The foregoing descriptions of the preferred embodiments of the present invention have been presented for purposes of illustration and description. They are not intended to be exhaustive or to limit the invention to the precise forms disclosed, and obviously many modifications and variations are possible in light of the above teaching. The illustrated embodiments were chosen and described in order to best explain the principles of the invention and its practical application to thereby enable others skilled in the art to best utilize the invention in various embodiments and with various modifications as are suited to the particular use contemplated. For example, one skilled in the art will recognize that the embodiments of the present invention may employed in global weather forecasting services such as providing early warning of ocean-going tsunamis or forecasting electrical interference in the atmosphere/ionosphere. Additionally, the remote sensing and measuring equipment deployed in embodiments of the present invention may also provide scientific data for further research and development.

In this specification, "a" and "an" and similar phrases are to be interpreted as "at least one" and "one or more." References to "an" embodiment in this disclosure are not necessarily to the same embodiment.

Many of the elements described in the disclosed embodiments may be implemented as modules. For example, embodiments of the present invention may employ gas rate detection 620, latent heat energy released rate 640, transient OLR anomaly detection 660, and ionospheric anomaly detection 680 and earthquake forecast 690 modules. A module is defined here as an isolatable element that performs a defined function and has a defined interface to other elements. The modules described in this disclosure may be implemented in hardware, a combination of hardware and software, firmware, wetware (i.e. hardware with a biological element) or a combination thereof, all of which are behaviorally equivalent. For example, modules may be implemented using computer hardware in combination with software routine(s) written in a computer language (such as C, C++, Fortran™ Java™, Basic, Matlab™ or the like) or a modeling/simulation program such as Simulink™, Stateflow™, GNU Octave, or LabVIEW™ MathScript. Additionally, it may be possible to implement modules using physical hardware that incorporates discrete or programmable analog, digital and/or quantum hardware. Examples of programmable hardware include: computers, microcontrollers, microprocessors, application-specific integrated circuits (ASICs); field programmable gate arrays (FPGAs); and complex programmable logic devices (CPLDs). Computers, microcontrollers and microprocessors are programmed using languages such as assembly, C, C++ or the like. FPGAs, ASICs and CPLDs are often programmed using hardware description languages (HDL) such as VHSIC hardware description language (VHDL) or Verilog that configure connections between internal hardware modules with lesser functionality on a programmable device. Finally, it needs to be emphasized that the above mentioned technologies may be used in combination to achieve the result of a functional module.

The disclosure of this patent document incorporates material which is subject to copyright protection. The copyright owner has no objection to the facsimile reproduction by anyone of the patent document or the patent disclosure, as it appears in the Patent and Trademark Office patent file or records, for the limited purposes required by law, but otherwise reserves all copyright rights whatsoever.

In addition, it should be understood that any figures that highlight any functionality and/or advantages, are presented for example purposes only. The disclosed architecture is sufficiently flexible and configurable, such that it may be utilized in ways other than that shown. For example, the steps listed in any flowchart may be re-ordered or only optionally used in some embodiments.

Further, the purpose of the Abstract of the Disclosure is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The Abstract of the Disclosure is not intended to be limiting as to the scope in any way.

Finally, it is the applicant's intent that only claims that include the express language "means for" or "step for" be interpreted under 35 U.S.C. 112, paragraph 6. Claims that do not expressly include the phrase "means for" or "step for" are not to be interpreted under 35 U.S.C. 112, paragraph 6.

The invention claimed is:

1. An earthquake warning system comprising:
   a ground based platform;
   remote sensing platforms including a satellite and a plurality of aircraft;
   one or more processors;
   a network communicatively coupled to:
     gas migration measurement devices;
     air ionization measurement devices coupled to at least some of the remote sensing platforms;
     an air temperature sensor;
     a relative humidity sensor;
     an air pressure sensor; and
     an ionosphere measurement device; and
   memory storing instructions that, when executed by the one or more processors, cause the earthquake warning system to:
     collect gas measurements from the gas migration measurement devices obtained over a first period of time;
     determining a gas migration rate using the gas measurements;
     in response to the gas migration rate increasing at greater than a first rate:
       collect at least one of the following:
         air ionization measurements from the air ionization measurement devices; and meteorological measurements from:
the air temperature sensor;
the relative humidity sensor; and
the air pressure sensor; and
determine a latent heat energy release rate over a second period of time using at least two of the following:
the air ionization measurements;
the meteorological measurements; and
a numerical assimilation model;
in response to the latent heat energy release rate increasing at greater than a second rate:
look for at least one transient outgoing long wave radiation (OLR) anomaly using atmospheric measurements collected over a third period of time;
in response to observing the transient OLR:
collect ionosphere measurements from the ionosphere measurement device obtained over a fourth period of time; and
look for at least one ionospheric anomaly using the ionosphere measurements; and
in response to observing the at least one ionospheric anomaly, generating a forecast alert that an earthquake is likely to occur within one to four days from the observation of the at least one ionospheric anomaly.

2. The earthquake warning system of claim 1, wherein the first period of time is between one to fifteen days.

3. The earthquake warning system of claim 1, wherein the gas measurements comprise measured radon activity that exceed 2000 Becquerel per cubic meter at a depth of −70 cm up to ground level.

4. The earthquake warning system of claim 1, wherein the gas measurements comprise measured radon activity and the second period of time starts after a peak in the measured radon activity.

5. The earthquake warning system of claim 1, wherein the second period of time is between four days to one week.

6. The earthquake warning system of claim 1, wherein the numerical assimilation model is an atmospheric numerical model.

7. The earthquake warning system of claim 1, wherein the numerical assimilation model processes:
a) satellite data;
b) aircraft data;
b) ground data; and
c) theoretical estimates.

8. The earthquake warning system of claim 1, wherein the transient outgoing long wave radiation (OLR) anomaly has a temporal allocation between one to ten hours.

9. The earthquake warning system of claim 1, wherein the third period of time is between one to two days.

10. The earthquake warning system of claim 1, wherein the transient outgoing long wave radiation (OLR) anomaly is determined against a normal trend defined by a multiyear average of ongoing long wave radiation.

11. The earthquake warning system of claim 1, wherein the ionosphere measurement device is coupled to a satellite receiver in communication with the satellite.

12. The earthquake warning system of claim 1, wherein the at least one ionospheric anomaly has a temporal length of between one to ten hours.

13. The earthquake warning system of claim 1, wherein the fourth period of time is between one to four days.

14. The earthquake warning system of claim 1, wherein the at least one ionospheric anomaly comprises at least one of the following types of the ionospheric anomaly:
a) ionospheric electron and ion concentration anomaly;
b) ionospheric electron and ion temperature anomaly;
c) ionospheric ion composition anomaly; and
d) ionospheric height scale anomaly.

15. The earthquake warning system of claim 1, wherein at least one additional ionospheric anomaly is triggered by one of the at least one ionospheric anomaly, the at least one additional ionospheric anomaly comprising at least one of the following:
a) an ionospheric very low frequency (VLF) noise scattering anomaly;
b) an ionospheric electrostatic extremely low frequency (ELF) wave anomaly;
c) an ionospheric precipitation of energetic electrons anomaly;
d) an anomalous modification of D-Regions; and
e) an anomalous propagation of VLF waves within waveguide Earth-ionosphere.

16. The earthquake warning system of claim 1, wherein the instructions, when executed by the one or more processors, further cause the earthquake warning system to, in response to observation of the transient outgoing long wave radiation (OLR) anomaly, determine convective air motion values using air conductivity measurements collected from an air conductivity measurement device over a 1 to 5-day period.

17. The earthquake warning system of claim 1, wherein the instructions, when executed by the one or more processors, further cause the earthquake warning system to determine if transient thermal field values increase temporally from lower elevations to higher elevations forming OLR anomalies.

18. The earthquake warning system of claim 1, wherein the instructions, when executed by the one or more processors, further cause the earthquake warning system to:
a) determine a local deformation rate change using local deformation measurements; and
b) adjust the gas migration rate using the local deformation rate change.

19. The earthquake warning system of claim 1, further comprising an aerosol measurement device communicatively coupled to the network wherein the instructions, when executed by the one or more processors, further cause the earthquake warning system to:
a) determine changes in local aerosol type and size using aerosol measurements collected from the aerosol measurement device; and
b) use the changes in local aerosol type and size in determining the latent heat energy release rate.

20. The earthquake warning system of claim 1, wherein the gas measurements comprise radon gas measurements.

* * * * *